US012785615B1

(12) United States Patent
Almutlaq et al.

(10) Patent No.: US 12,785,615 B1
(45) Date of Patent: Nov. 3, 2026

(54) AUTONOMOUS ROBOTIC CLEANING DEVICE

(71) Applicant: PRINCE MOHAMMAD BIN FAHD UNIVERSITY, Dhahran (SA)

(72) Inventors: Meshari Khalid Almutlaq, Dammam City (SA); Feroz Shaik, Pradesh (IN)

(73) Assignee: PRINCE MOHAMMAD BIN FAHD UNIVERSITY, Dhahran (SA)

( * ) Notice: Subject to any disclaimer, the term of this patent is extended or adjusted under 35 U.S.C. 154(b) by 0 days.

(21) Appl. No.: 19/638,043

(22) Filed: Apr. 2, 2026

(51) Int. Cl.

| | |
|---|---|
| ***H02S 40/10*** | (2014.01) |
| ***B25J 9/04*** | (2006.01) |
| ***B25J 11/00*** | (2006.01) |
| ***G05D 1/644*** | (2024.01) |
| ***G05D 105/80*** | (2024.01) |
| ***G05D 109/20*** | (2024.01) |
| ***G05D 111/10*** | (2024.01) |
| ***G06Q 10/20*** | (2023.01) |

(52) U.S. Cl.
CPC ............... *H02S 40/10* (2014.12); *B25J 9/042* (2013.01); *B25J 11/0085* (2013.01); *G05D 1/644* (2024.01); *G06Q 10/20* (2013.01); *G05D 2105/89* (2024.01); *G05D 2109/20* (2024.01); *G05D 2111/14* (2024.01)

(58) Field of Classification Search
None
See application file for complete search history.

(56) References Cited

U.S. PATENT DOCUMENTS

2021/0104974 A1 4/2021 Meller et al.

FOREIGN PATENT DOCUMENTS

| | | | | |
|---|---|---|---|---|
| CN | 103084360 A | 5/2013 | | |
| CN | 106656039 A * | 5/2017 | ............ | G01D 21/02 |
| IN | 202541038481 | 5/2025 | | |
| WO | WO 2025/103039 A1 | 5/2025 | | |

OTHER PUBLICATIONS

English-language machine translation of CN-106656039-A. (Year: 2026).*

Vikas Singh Panwar, et al., "Design and fabrication of a novel concept-based autonomous controlled solar powered four-wheeled Floor Cleaning Robot for wet and dry surfaces", International Journal of Information Technology, vol. 14, No. 4, Feb. 14, 2022, pp. 1995-2004.

* cited by examiner

*Primary Examiner* — Eli S Mekhlin
(74) *Attorney, Agent, or Firm* — Oblon, McClelland, Maier & Neustadt, L.L.P.

(57) ABSTRACT

An autonomous robotic cleaning device includes a modular aluminum chassis with acrylic wheels, powered by rechargeable battery packs and an onboard solar panel. The device features sensors, including ultrasonic rangefinders, color and light-intensity sensors, and an onboard camera, to monitor the surroundings and detect the accumulation of dust on photovoltaic panels. The device also includes an air-based cleaning assembly with a multi-nozzle system to clean the panels. The control system processes sensor data to determine when to initiate cleaning operations and generates signals to control the movement of the wheels and the cleaning assembly, allowing the device to autonomously clean the panels. A method for autonomously cleaning one or more photovoltaic panels using an autonomous robotic cleaning device.

18 Claims, 13 Drawing Sheets

AUTONOMOUS ROBOTIC CLEANING DEVICE

STATEMENT OF PRIOR DISCLOSURE BY AN INVENTOR

Aspects of the present disclosure are described in M. Almutlaq, F. Jastaniah, A. Alharbi, H. Alghamdi, M. A. Yousif and F. Shaik, "Design and Analysis of a Smart Solar Panel Cleaning Robot," 2025 11th International Conference on Mechatronics and Robotics Engineering (ICMRE), Lille, France, 2025, pp. 104-109, doi: 10.1109/ICMRE64970.2025.10976316., which is incorporated herein by reference in its entirety.

BACKGROUND

Technical Field

The present disclosure is directed to an autonomous robotic cleaning device. More particularly, the present disclosure pertains to cleaning and offering a versatile, self-powered solution for dust removal across diverse solar applications.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Solar panel cleaners are specialized systems designed to remove dust, sand, bird droppings, and other environmental contaminants that accumulate on panel surfaces during regular operation. Such accumulation may significantly reduce the energy generation efficiency of the solar panels over time. These solar panel cleaners are routinely deployed in utility-scale solar farms, commercial rooftop installations, and residential systems to maintain optimal light transmission and consistent power output, particularly in regions exposed to high dust levels or infrequent rainfall.

However, existing solar panel cleaners predominantly rely on rail-mounted robotic mechanisms or water-intensive washing systems, both of which present notable economic and operational drawbacks, especially in arid and semi-arid regions. Rail-based solar panel cleaners necessitate permanent mechanical infrastructure along panel arrays, increasing installation complexity, capital expenditure, and long-term maintenance requirements. Water-based solar cleaners, although widely used, demand substantial water resources and auxiliary components such as pumps and storage units, rendering them inefficient and unsustainable in water-scarce environments. Consequently, despite their widespread usage, conventional solar panel cleaners often fail to offer a cost-effective, scalable, and resource-efficient solution for maintaining solar panel performance in regions where cleaning demand is high but water and infrastructure availability are limited.

As a result, current rail-mounted or water-based solar panel cleaners lack a unified, interoperable, and intelligent framework capable of holistically mitigating efficiency and mechanical assembly-based performance degradation across the solar energy production system in real time, thereby limiting operational efficiency, scalability, and long-term system reliability.

Accordingly, it is one object of the present disclosure to provide a device and method for overcoming the above disadvantages of the existing solar panel cleaners.

SUMMARY

In an exemplary embodiment, an autonomous robotic cleaning device is disclosed. The device includes a modular aluminum chassis comprising a plurality of independently driven acrylic wheels. Each of the independently driven acrylic wheels is operatively connected to a plurality of geared motors for a rail-free traversal. The device further includes a power supply system comprising a plurality of rechargeable battery packs and an onboard solar panel for intermittent self-charging. The device further includes a plurality of sensors arranged around the modular aluminum chassis. The plurality of sensors comprises at least one ultrasonic rangefinder configured to detect one or more edges of one or more photovoltaic panels. The plurality of sensors further comprises at least one color and light-intensity sensor configured to detect and quantify accumulation of dust on the one or more photovoltaic panels. The plurality of sensors finally comprises an onboard camera configured to monitor the one or more photovoltaic panels. The device further includes an air-based cleaning assembly comprising a multi-nozzle assembly with a plurality of stainless-steel flat-head nozzles that are arranged in a predetermined jet pattern and connected to an air compressor. The device finally includes a control system operatively connected to the plurality of sensors, the plurality of independently driven acrylic wheels, and the air-based cleaning assembly. The control system is configured to process a sensor data to determine an initiation of one or more cleaning operations based on detected and quantified accumulation of dust and to generate one or more control signals for the plurality of independently driven acrylic wheels and the air-based cleaning assembly during an autonomous operation.

In some embodiments, the plurality of independently driven acrylic wheels is powered by a 24 Volts direct current geared motor for the rail-free traversal.

In some embodiments, the plurality of independently driven acrylic wheels is arranged to provide an omnidirectional movement over a plurality of photovoltaic arrays.

In some embodiments, the plurality of rechargeable battery packs comprises: a plurality of 6S lithium-polymer batteries arranged in a series-parallel configuration to supply a 24 Volts source.

In some embodiments, the air-based cleaning assembly comprises: a perforated aluminum tube connected to a centrifugal blower configured to produce an air curtain.

In some embodiments, the control system comprises a microcontroller.

In some embodiments, the plurality of stainless-steel flat-head nozzles has approximately 0.86 mm diameter orifices configured to produce a plurality of multiple parallel high-velocity air jets.

In some embodiments, the modular aluminum chassis further comprises a plurality of mounting points configured to secure the power supply system, the plurality of sensors, and the control system.

In some embodiments, the at least one ultrasonic rangefinder is positioned at a front perimeter and a lateral perimeter of the modular aluminum chassis to detect the one or more edges of the one or more photovoltaic panels.

In some embodiments, the power supply system further comprises a shock-absorbent enclosure for housing the plurality of 6S lithium-polymer batteries.

In some embodiments, the onboard solar panel is mounted on an upper side of the modular aluminum chassis.

In some embodiments, the control system is programmed with a plurality of sensor-driven algorithms to coordinate an operation of the plurality of independently driven acrylic wheels, the plurality of sensors, and the air-based cleaning assembly in response to a real-time sensor input.

In another exemplary embodiment, a method for autonomously cleaning one or more photovoltaic panels using an autonomous robotic cleaning device is disclosed. The method includes providing a modular aluminum chassis equipped with a plurality of independently driven acrylic wheels operatively connected to a plurality of geared motors for a rail-free traversal. The method further includes powering the autonomous robotic cleaning device based on a power supply system comprising a plurality of rechargeable battery packs and an onboard solar panel configured for intermittent self-charging. The method further includes sensing, via a plurality of sensors arranged around the modular aluminum chassis, a plurality of operational conditions of the one or more photovoltaic panels. The sensing includes detecting, using at least one ultrasonic rangefinder, one or more edges of the one or more photovoltaic panels. The sensing further includes detecting and quantifying, using at least one color and light-intensity sensor, an accumulation of dust on the one or more photovoltaic panels. The sensing finally includes monitoring, through an onboard camera, the one or more photovoltaic panels. The method further includes processing, by a control system operatively connected to the plurality of sensors, a sensor data corresponding to the one or more edges that are detected and quantified dust accumulation. The method further includes determining, by the control system, initiation of one or more cleaning operations based on the sensor data. The method further includes generating, by the control system, one or more control signals for the plurality of independently driven acrylic wheels to enable the rail-free traversal over the one or more photovoltaic panels. The method finally includes activating, by the control system, an air-based cleaning assembly to perform cleaning of the one or more photovoltaic panels during an autonomous operation.

In some embodiments, the method for autonomously cleaning one or more photovoltaic panels using an autonomous robotic cleaning device further includes powering the autonomous robotic cleaning device comprises supplying a 24-volt power source from a plurality of 6S lithium-polymer battery packs arranged in a series-parallel configuration.

In some embodiments, the method for autonomously cleaning one or more photovoltaic panels using an autonomous robotic cleaning device further includes activating the air-based cleaning assembly by generating an air curtain using a perforated aluminum tube connected to a centrifugal blower.

In some embodiments, the method for autonomously cleaning one or more photovoltaic panels using an autonomous robotic cleaning device further includes processing the sensor data using the control system.

In some embodiments, the method for autonomously cleaning one or more photovoltaic panels using an autonomous robotic cleaning device further includes activating the air-based cleaning assembly to direct a plurality of parallel high-velocity air jets through the stainless-steel flat-head nozzles having approximately 0.86 mm diameter orifices.

In some embodiments, the method for autonomously cleaning one or more photovoltaic panels using an autonomous robotic cleaning device further includes securing the power supply system, the plurality of sensors, and the control system to the modular aluminum chassis using a plurality of mounting points.

In some embodiments, the method for autonomously cleaning one or more photovoltaic panels using an autonomous robotic cleaning device further includes detecting the one or more edges of the one or more photovoltaic panels comprises positioning the at least one ultrasonic rangefinder at a front perimeter and a lateral perimeter of the modular aluminum chassis.

In some embodiments, the method for autonomously cleaning one or more photovoltaic panels using an autonomous robotic cleaning device further includes intermittent self-charging comprising receiving solar energy using the onboard solar panel mounted on an upper side of the modular aluminum chassis.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
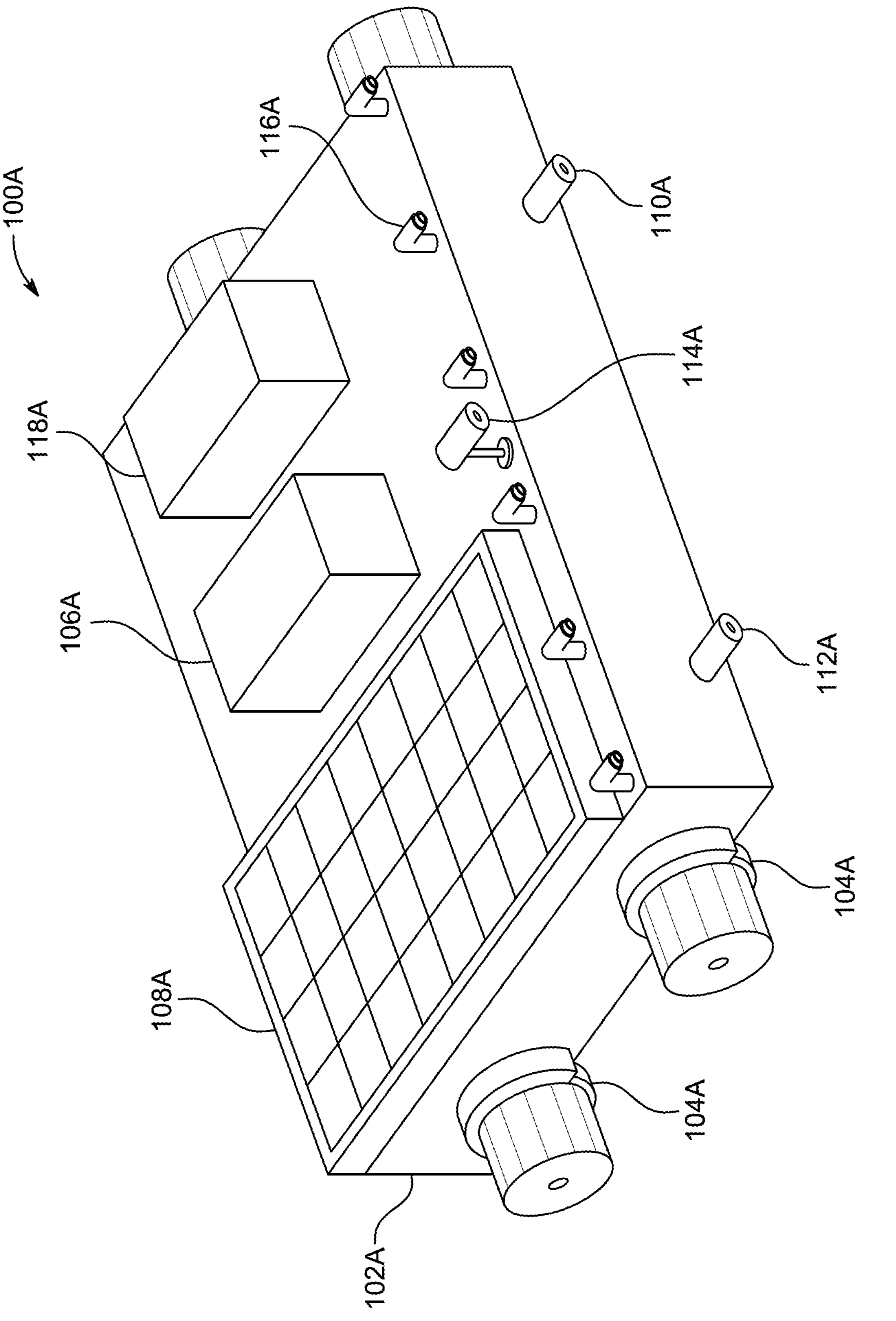
FIG. 1A is a perspective view of an autonomous robotic cleaning device illustrating the components.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Solar panel cleaners are specialized systems that function to remove dust, sand, bird droppings, and other environmental contaminants that accumulate on photovoltaic surfaces during normal operation, as such soiling directly impedes light transmission and progressively degrades energy generation efficiency. The buildup of these contaminants may result in a substantial reduction in overall solar panel system performance, leading to decreased power output, higher operational losses, and increased maintenance expenditure. In addition, persistent debris accumulation may contribute to surface abrasion, hotspot formation, and premature wear of panel components, thereby shortening the operational lifespan of the solar panels. Consequently, regular and effective cleaning of solar panels is essential to preserve optimal optical performance and ensure consistent power generation, particularly in regions characterized by high dust exposure, arid climatic conditions, or infrequent rainfall, where soiling severity is significantly amplified.

Existing rail-mounted and water-based solar panel cleaners represent two dominant approaches, each with distinct mechanisms and limitations. Rail-mounted systems employ fixed guide rails installed along panel rows to move a motorized carriage carrying brushes, wipers, microfiber rollers, or air-blowers across the module surface. They require precise alignment, permanent structural additions, and dedicated power/control cabling, increasing capex and complicating retrofits. Water-based systems rely on spray bars, nozzles, or manual/robotic wands to apply water followed by brushing or squeegeeing; large sites need pumps, tanks, filtration/softening to control mineral content, and drainage management to avoid spotting and residue. In arid and dust-prone regions, where solar installations are most prevalent, water availability is often limited, rendering these solar panel cleaners impractical and unsustainable.

To overcome the challenges in the existing solutions, an autonomous robotic cleaning device and method for autonomously cleaning one or more photovoltaic panels using the autonomous robotic cleaning device are described. The autonomous robotic cleaning device provides advantages, inter alia, such as:

1. Rail-free, fully autonomous cleaning robot
2. Optimized energy and water use
3. Self-powered through own solar panel of the autonomous robotic cleaning device
4. Reduced maintenance costs The goal of the autonomous robotic cleaning device is to provide a cost-effective, resource-efficient, and fully autonomous solution for maintaining the cleanliness and performance of solar panels, particularly in dust-prone and water-scarce environments. Specifically, the autonomous robotic cleaning device aims to eliminate reliance on fixed rail infrastructure and water-based cleaning methods by employing a lightweight, rail-free robotic platform that utilizes high-velocity air jets for effective dust removal. By integrating onboard ultrasonic sensing and autonomous control systems, the autonomous robotic cleaning device is designed to safely navigate across photovoltaic panel surfaces, accurately detect panel boundaries and obstacles, and initiate cleaning operations only when soiling levels warrant intervention. Additionally, the autonomous robotic cleaning device seeks to achieve complete energy independence through self-powering via the integrated solar panel, thereby minimizing external power requirements and operational downtime.

Referring now to FIG. 1A, is a perspective view of an autonomous robotic cleaning device illustrating the components.

As shown in FIG. 1A, the perspective view 100A illustrates an exemplary embodiment of the autonomous robotic cleaning device configured to traverse a photovoltaic panel surface. The autonomous robotic cleaning device comprises a modular aluminum chassis 102A supporting a plurality of wheels, which may be a plurality of independently driven acrylic wheels 104A, the plurality of independently driven acrylic wheels 104A being operatively connected to a plurality of geared motors (not shown in FIG. 1A) for a rail-free traversal. The autonomous robotic cleaning device includes a power supply system 106A comprising a plurality of rechargeable battery packs. The power supply system 106A is electrically connected to an onboard solar panel 108A, which is configured to harvest solar energy and store the harvested energy for powering the autonomous robotic cleaning device. The autonomous robotic cleaning device includes at least one ultrasonic rangefinder 110A configured to detect edges of one or more photovoltaic panels, and additionally, a color and light-intensity sensor 112A is configured to assess soiling-related irradiance reduction and generate signals indicative of dust accumulation. The autonomous robotic cleaning device includes an onboard camera 114A, which provides visual feedback for monitoring photovoltaic panels. The autonomous robotic cleaning device further includes an air-based cleaning assembly comprising a multi-nozzle assembly with a plurality of stainless-steel flat-head nozzles 116A that are configured to direct high-velocity airflow across the photovoltaic surface to dislodge and remove dust without physical contact or water usage. The autonomous robotic cleaning device finally includes a control system 118A configured to execute control instructions for navigation, cleaning initiation, and coordination. The control system 118A is configured to selectively activate the cleaning assembly based on the sensor-derived inputs, thereby optimizing energy usage and ensuring autonomous, safe, and efficient cleaning of the photovoltaic surface. In an embodiment, the control system 118A may further process real-time feedback from the sensor to dynamically adjust movement patterns and cleaning intensity based on surface conditions. Further, the control system 118A may be configured to communicate with an external monitoring interface to enable remote supervision, diagnostics, and performance optimization of the cleaning operations.

The autonomous robotic cleaning device may represent various forms of independently driven acrylic wheels 104A, such as solid flat acrylic wheels, or grooved acrylic wheels, or rubber-coated acrylic wheels, or flanged acrylic wheels or hub-mounted acrylic wheels. The independently driven acrylic wheels 104A of the autonomous robotic cleaning device are configured to enable stable, controlled, and omnidirectional movement of the autonomous robotic cleaning device across the surface of the photovoltaic panels without causing damage to the panel surface. Each independently driven acrylic wheel 104A is powered by a 24-volt direct current from a plurality of geared motors, allowing independent or coordinated rotation to facilitate omnidirectional movements. During operation, the independently driven acrylic wheels 104A maintain continuous contact with the panel surface, providing sufficient traction to support the weight of the autonomous robotic cleaning device while accommodating minor surface irregularities and panel inclinations. The independently driven acrylic wheels 104A enable smooth traversal along the length of the panel while permitting controlled movement based on control signals received from the control system 118. Feedback from the plurality of sensors is used by the control system 118A to regulate the independently driven acrylic wheels 104A motion, ensuring safe navigation near panel edges and preventing slippage or unintended displacement.

The plurality of rechargeable battery packs of the power supply system 106A comprises multiple 6S lithium-polymer battery units electrically arranged in a series-parallel configuration to provide a regulated 24-volt power source for the autonomous robotic cleaning device. The power supply system 106A of the autonomous robotic cleaning device further comprises a shock-absorbent enclosure for housing the plurality of 6S lithium-polymer batteries. Each 6S lithium-polymer battery includes six electrochemical cells connected in series, collectively producing a nominal voltage of approximately 22.2 volts. This series-parallel arrangement enables stable delivery of sufficient voltage to drive the geared motors, control electronics, sensors, and air-based cleaning assembly, while simultaneously extending operational runtime through increased capacity.

The onboard solar panel 108A is mounted on the upper side of the modular aluminum chassis 102A and configured to provide intermittent self-charging of the autonomous robotic cleaning device during both operational and idle periods. In operation, the onboard solar panel 108A converts incident solar radiation into electrical energy, which is stored in the plurality of rechargeable battery packs. The generated electrical power is used to supplement the stored energy in the rechargeable battery packs, maintaining the charge level during cleaning operations and recharging the battery packs when the autonomous robotic cleaning device is stationary or operating under low-load conditions. The control system 118A regulates the charging process to prevent overcharging and to prioritize power distribution to the autonomous robotic cleaning device components.

The ultrasonic rangefinder 110A, the color and light-intensity sensor 112A, and the onboard camera 114A collectively function as the plurality of sensors that enable autonomous perception, decision-making, and safe operation of the autonomous robotic cleaning device. The ultrasonic rangefinder 110A, positioned at the front perimeter and the lateral perimeter of the modular aluminum chassis 102A, operates by emitting high-frequency acoustic pulses toward the surrounding environment and measuring the time taken for the reflected signals to return, thereby determining the distance to panel edges, obstacles, or discontinuities and generating proximity data used to prevent falls or collisions. The color and light-intensity sensor 112A is configured to measure variations in reflected light and irradiance levels from the photovoltaic surface, and the deviations from expected baseline values are indicative of dust accumulation or soiling, enabling quantitative assessment of cleaning necessity. The onboard camera 114A captures real-time visual data of the panel surface, which may be used for monitoring, diagnostics, surface verification, and supplemental decision support. In one embodiment, the real-time visual data may be processed using image analysis algorithms to detect dust accumulation, debris patterns, or surface anomalies. Further, the real-time visual data may be stored or transmitted to an external system to enable historical tracking, performance evaluation, and remote inspection of the photovoltaic surface. Signals from the ultrasonic rangefinder 110A, the color and light-intensity sensor 112A, and the onboard camera 114A are transmitted to the control system 118A, which processes the signals to determine navigation paths, initiate or suspend cleaning operations, and ensure safe, efficient, and autonomous functioning of the autonomous robotic cleaning device.

The air-based cleaning assembly may comprise alternative embodiments for generating directed airflow to remove dust from the photovoltaic surface. In one embodiment, the air-based cleaning assembly includes a perforated aluminum tube operatively connected to a centrifugal blower, which is configured to deliver pressurized airflow into the perforated aluminum tube and expel the pressurized airflow to form a substantially continuous air curtain across the width of the solar panel, thereby dislodging and expelling dust in a non-contact and waterless manner. In an alternative embodiment, the air-based cleaning assembly comprises the multi-nozzle assembly including the plurality of stainless-steel flat-head nozzles 116A arranged in a predetermined jet pattern and connected to the air compressor. During operation, the air compressor supplies compressed air to the plurality of stainless-steel flat-head nozzles 116A with 0.86 mm diameter orifices, which discharge multi parallel high-velocity air jets in a coordinated pattern directed toward the panel surface, generating localized shear forces sufficient to remove accumulated dust and debris.

The control system 118A of the autonomous robotic cleaning device includes a microcontroller. The control system 118A may represent various forms of microcontroller such as Arduino Uno (ATmega328P) or Arduino Mega (ATmega2560) or ESP32 or ESP8266 or PIC16F/PIC18F series (Microchip) or STM32 series (STMicroelectronics) or ATmega32/ATmega128 or MSP430 (Texas Instruments) or Raspberry Pi Pico (RP2040) or NXP LPC series. The microcontroller is configured as an embedded supervisory controller executing the plurality of sensor-driven algorithms that fuse real-time inputs to coordinate the operation of the independently driven acrylic wheels 104A, the plurality of sensors, and the air-based cleaning assembly. In operation, edge- and obstacle-proximity data from ultrasonic rangefinders 110A are continuously filtered and fed to the microcontroller, which adjusts the velocities of independently driven acrylic wheels 104A to maintain safe standoff from panel edges and to execute omnidirectional movements on inclined or low-friction glass surfaces. In parallel, the microcontroller analyses the color and light-intensity signals from the color and light-intensity sensor 112A to infer dust accumulation against stored baselines and environmental context; when threshold conditions are met, a cleaning-decision policy triggers the air-based assembly, modulating centrifugal blower speed to deliver the required air pressure while minimizing energy use. The microcontroller arbitrates among navigation, cleaning, and power-management objectives, prioritizing intermittent self-charging events and throttling noncritical loads when battery state-of-charge declines.

Figure 1B:
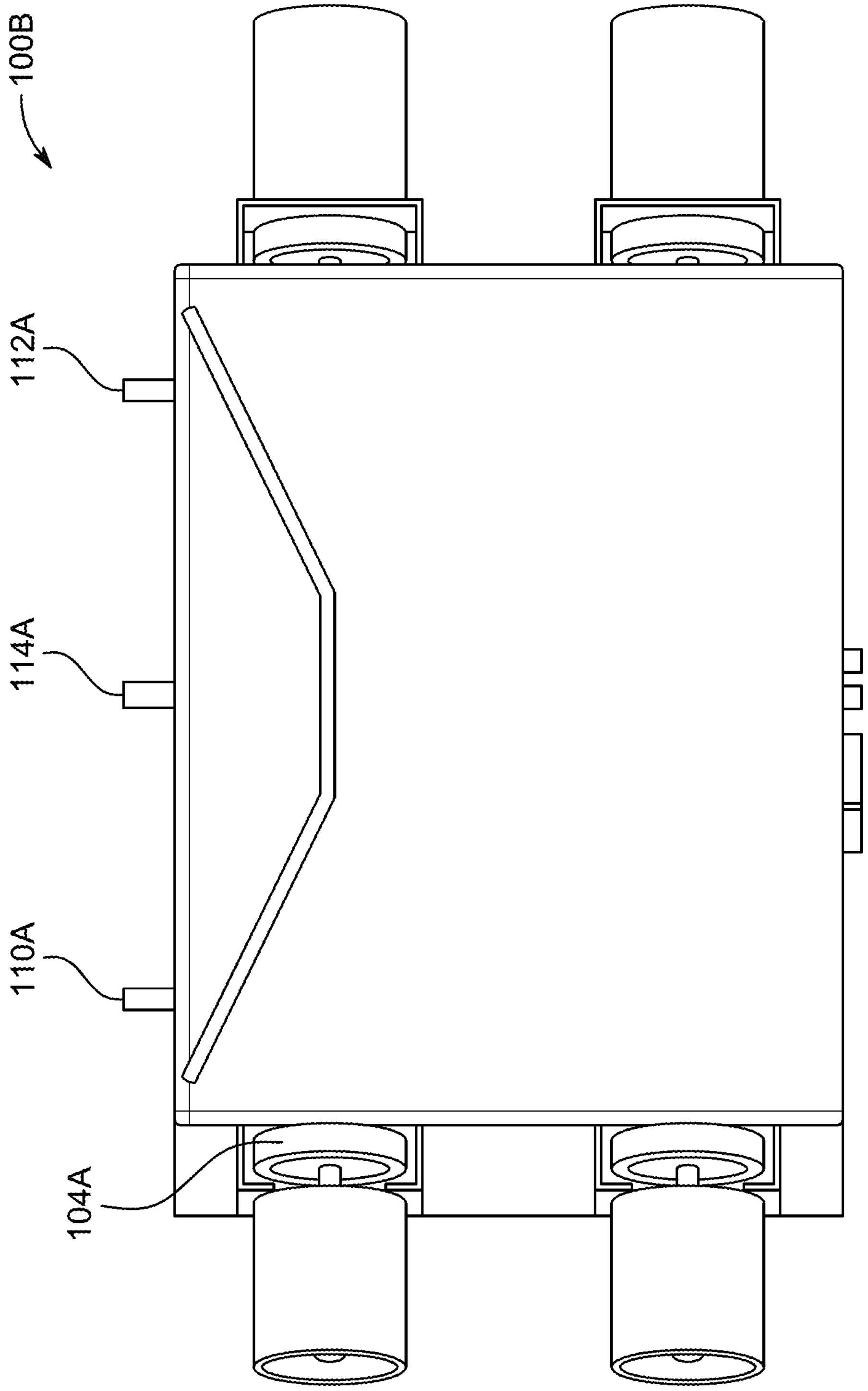
FIG. 1B is a bottom view of an autonomous robotic cleaning device illustrating the components.

Referring now to FIG. 1B, is a bottom view of an autonomous robotic cleaning device illustrating the components. As shown in FIG. 1B, the bottom view 100B illustrates the underside layout of the autonomous robot cleaning device illustrating the independently driven acrylic wheels 104A arranged laterally to enable stable traversal over photovoltaic glass; along the upper edge of the view, the perimeter-facing plurality of sensors comprises the ultrasonic rangefinder 110A for panel edge or obstacle detection, the color and light-intensity sensor 112A for soiling assessment, and the onboard camera 114A for visual monitoring and diagnostics; these components provide real-time inputs to the microcontroller of the control system 118A to modulate wheel velocities, maintain safe standoff from panel boundaries, and trigger cleaning only when dust accumulation warrants action.

Figure 2A:
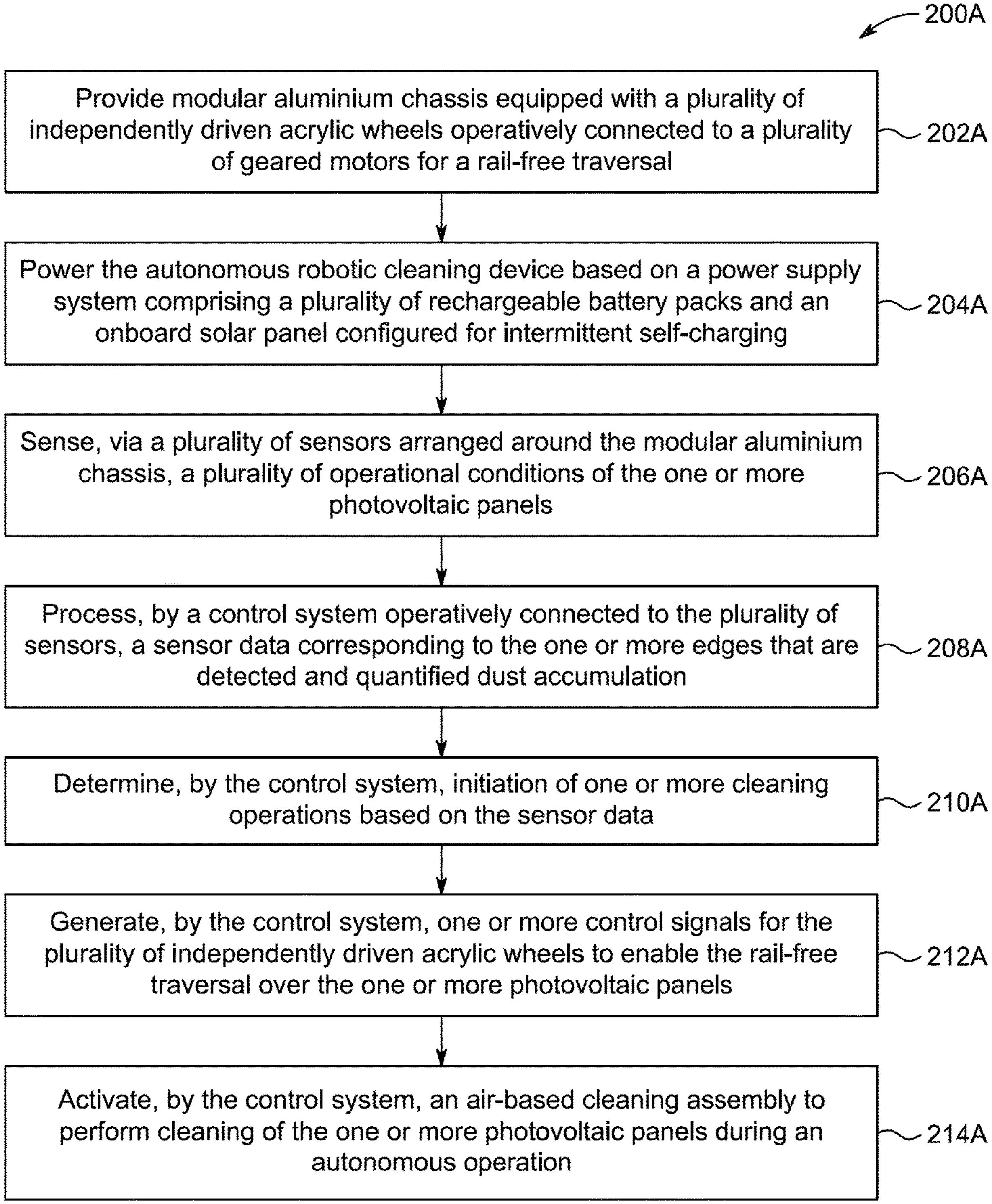
FIG. 2A is a flow diagram depicting a method for autonomously cleaning one or more photovoltaic panels using an autonomous robotic cleaning device.

Referring now to FIG. 2A, is a flow diagram depicting a method for autonomously cleaning one or more photovoltaic panels using an autonomous robotic cleaning device.

As shown in FIG. 2A, the flow diagram 200A illustrates solar panel cleaning method of the autonomous robotic cleaning device. The autonomous robotic cleaning device provides the modular aluminum chassis 102A equipped with the plurality of independently driven acrylic wheels 104A coupled to geared motors, enabling stable, rail-free traversal across photovoltaic panels. The autonomous robotic cleaning device is then powered through the power supply system 106A, comprising multiple rechargeable battery packs, which are supplemented by intermittent self-charging via the onboard solar panel 108A, ensuring self-charging. During movement, the plurality of sensors arranged around the modular aluminum chassis 102A continuously sense operational conditions of the photovoltaic panels, including panel edges, surface boundaries, and the extent of dust accumulation. The sensor data is then processed by the control system 118A microcontroller, which evaluates detected edges and quantifies soiling levels to determine whether cleaning is required. Based on this real-time analysis, the control system 118A generates control signals to coordinate the independently driven acrylic wheels 104A, allowing precise, safe, and adaptive navigation across the panel surface. Finally, when cleaning conditions are satisfied, the control system 118A activates the air-based cleaning assembly, enabling waterless, non-contact dust removal while the autonomous robotic cleaning device continues autonomous traversal.

At step 202A, an initial configuration and structural provisioning of the autonomous robotic cleaning device is implemented, where the modular aluminum chassis 102A is provided as the primary load-bearing framework and is equipped with the plurality of independently driven acrylic wheels 104A operatively connected to corresponding geared drive motors. The modular aluminum chassis 102A is designed to be lightweight yet mechanically rigid, thereby enabling stable operation on fragile photovoltaic panel surfaces while minimizing added load on the panels. The modular construction comprises plurality of mounting points to secure individual components including power supply system 106A, plurality of sensors, and the control system 118A thereby enhancing adaptability across different panel sizes and layouts. Each independently driven acrylic wheel 104A is independently driven by its respective geared motor, enabling differential motion control that allows the autonomous robotic cleaning device to perform precise omnidirectional movement and positional correction without reliance on external guide rails. These independently driven acrylic wheels 104A facilitates rail-free traversal across one or more photovoltaic panels, accommodates minor surface irregularities and panel inclinations, and provides the foundational mobility required for autonomous navigation.

At step 204A the powering of the autonomous robotic cleaning device through the integrated and self-sustaining power supply system 106A is disclosed. In this step, the autonomous robotic cleaning device is powered using the power supply system 106A comprising the plurality of rechargeable battery packs, preferably including multiple 6S lithium-polymer batteries arranged in the series-parallel configuration to provide a stable operating voltage, such as a 24-volt source, suitable for driving the geared motors, plurality of sensors, control system 118A, and air-based cleaning assembly. In addition, the onboard solar panel 108A mounted on the upper surface of the modular aluminum chassis 102A is electrically coupled to the rechargeable battery packs and configured for intermittent self-charging during operation and idle periods. The onboard solar panel 108A converts incident solar radiation into electrical energy, which is controlled by the power supply system 106A to safely replenish the rechargeable battery packs without overcharging. This power supply system 106A enables continuous and energy-efficient operation of the autonomous robotic cleaning device without reliance on external power sources or frequent manual recharging.

At step 206A the autonomous robotic cleaning device senses, via the plurality of sensors arranged around the modular aluminum chassis 102A, the plurality of operational conditions of the one or more photovoltaic panels. In this step 206A, plurality of sensors including the ultrasonic rangefinder 110A, the color and light-intensity sensors 112A, and the onboard camera 114A are spatially distributed around the modular aluminum chassis 102A to continuously monitor the panel surface and surrounding environment. The ultrasonic rangefinder 110A detects panel edges, gaps, and obstacles by measuring reflected acoustic signals, thereby generating proximity data indicative of boundary conditions and traversal safety. Concurrently, the color and light-intensity sensor 112A measures the variations in reflected light and irradiance levels from the photovoltaic surface, which are indicative of dust accumulation or soiling intensity. The onboard camera 114A captures visual information associated with surface condition and positional context, supporting monitoring and verification functions. Collectively, these sensors generate real-time operational data representing panel boundaries, surface cleanliness, and environmental conditions, which are subsequently transmitted to the microcontroller of the control system 118A for processing and decision-making.

At step 208A, the FIG. 200A the processing and interpretation of sensor data by the control system 118A to enable informed decision-making during autonomous operation. In this step 208A, the control system 118A is operatively connected to the plurality of sensors arranged around the modular aluminum chassis 102A and receives real-time sensor data corresponding to detected panel edges, surface boundaries, and quantified dust accumulation levels. The control system 118A executes programmed sensor-driven algorithms to analyze proximity data from ultrasonic rangefinder 110A to accurately identify panel edges and potential discontinuities, while simultaneously evaluating inputs from the color and light-intensity sensor 112A to determine the extent of soiling on the photovoltaic surface. Visual data from the onboard camera 114A may further supplement this analysis for validation and monitoring purposes. Based on this combined processing, the microcontroller of the control system 118A distinguishes between normal operating conditions and conditions requiring corrective action, such as cleaning initiation or navigation adjustment.

At step 210A, the FIG. 200A depicts the decision stage in which the control system 118A determines whether to initiate one or more cleaning operations based on the real-time plurality of sensor data acquired in prior steps. Specifically, after edge-proximity inputs from ultrasonic rangefinders 110A and soiling indicators from color and light-intensity sensors 112A are processed, the microcontroller evaluates the input measurements against stored baselines and threshold criteria that represent acceptable panel cleanliness and safe operating margins. When quantified dust accumulation exceeds the predefined threshold and boundary conditions confirm safe traversal, the microcontroller sets the cleaning-required signal and selects the appropriate cleaning mode; or else, the autonomous robotic cleaning device continues navigation without engaging the cleaning assembly. This analysis by the microcontroller controls the subsequent actuation coordinating of the independently driven acrylic wheels 104A for positioning and enabling either the perforated-tube air curtain driven by the centrifugal blower or the multi-nozzle 116, compressor-fed jet pattern and ensures requirement-based, waterless cleaning only when needed, while conserving energy.

At step 212A, the control system 118A generates one or more control signals for the plurality of independently driven acrylic wheels 104A to realize safe, precise, rail-free traversal over one or more photovoltaic panels. Using the outputs computed in prior steps such as the edge proximity from ultrasonic rangefinder 110A, the soiling context from color and light-intensity sensor 112A, and the visual inputs from the onboard camera 114, the microcontroller computes per-wheel speed, direction, and torque commands for the geared motors, applying closed-loop adjustments to compensate for panel inclination, local friction changes, or incipient slip. Differential drive logic maintains straight-line tracking along module rows, executes bounded turns at inter-panel gaps, and enforces deceleration zones near detected boundaries to prevent run-off.

At step 214A, the FIG. 200A represents the execution of the cleaning operation during autonomous traversal, where the control system 118A activates the air-based cleaning assembly to perform non-contact cleaning of one or more photovoltaic panels. After determining that the cleaning conditions are satisfied, the control system 118A generates activation signals to activate the air-delivery mechanism, which may include the centrifugal blower coupled to the perforated aluminum tube to form a continuous air curtain, or alternatively, the compressor-driven multi-nozzle 116 assembly arranged in the predetermined jet pattern. During activation, the air-based cleaning assembly directs high-velocity airflow toward the photovoltaic surface while the autonomous robotic cleaning device continues controlled movement across the panel, thereby dislodging and expelling accumulated dust and debris without physical contact or water usage. The microcontroller of the control system 118A may regulate the airflow parameters, such as pressure, velocity, and activation duration, based on real-time sensor feedback to ensure effective cleaning while minimizing energy consumption.

Figure 2B:
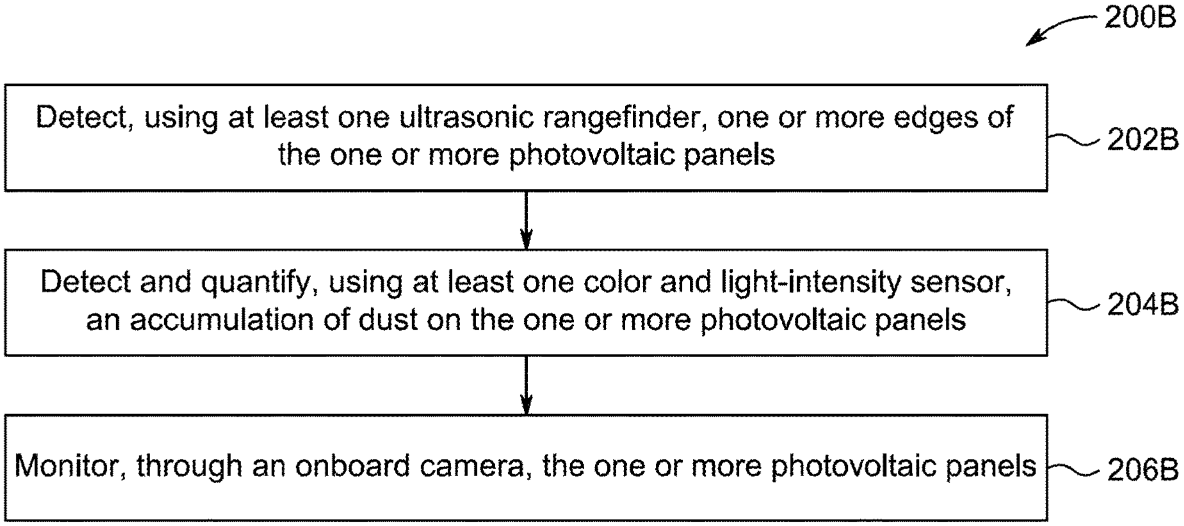
FIG. 2B is a flow diagram illustrating a method for sensing via a plurality of sensors arranged around the modular aluminum chassis.

Referring now to FIG. 2B, is a flow diagram illustrating a method for sensing via a plurality of sensors arranged around the modular aluminum chassis.

As shown in FIG. 2B, FIG. 200B illustrates the sensing operation performed by the autonomous robot cleaning device to ensure safe navigation and informed cleaning decisions. In step 202B, the autonomous robot cleaning device initially detects, using at the ultrasonic rangefinder 110A, one or more edges of the photovoltaic panels by transmitting ultrasonic pulses and measuring reflected signals, thereby identifying panel boundaries and preventing unintended displacement beyond the panel surface. Following edge detection, step 204B involves detecting and quantifying dust accumulation on the photovoltaic panels using color and light-intensity sensor 112A, where the variations in reflected light intensity and surface color are analyzed to assess the degree of soiling present on the panel surface. Subsequently, in step 206B, the autonomous robot cleaning device continuously monitors the photovoltaic panels through the onboard camera 114A, capturing visual information associated with surface condition, panel alignment, and operational context, which may be used for real-time monitoring, verification, and diagnostic support.

Figure 3:
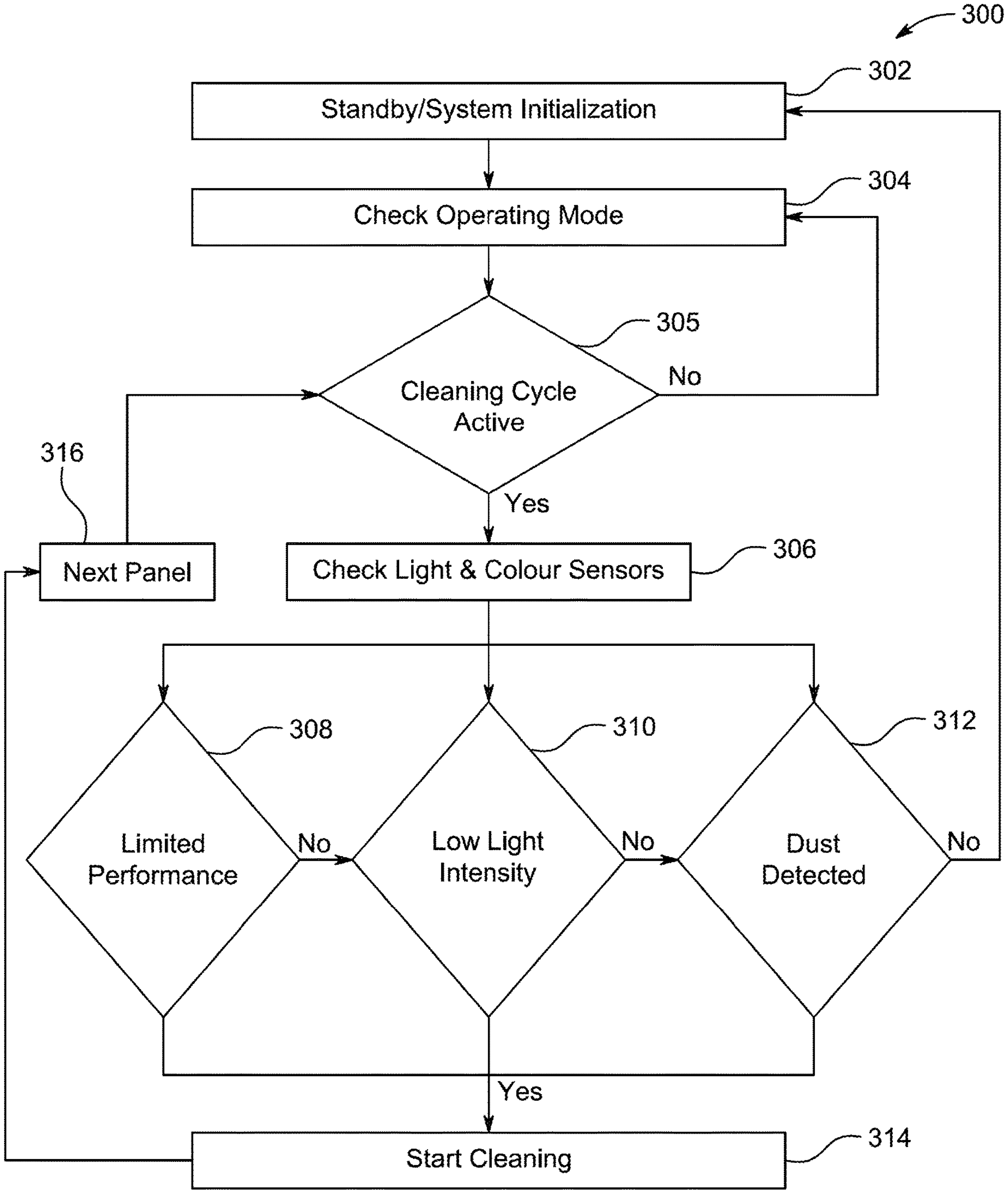
FIG. 3 is a flowchart diagram showing an operational control method for the autonomous cleaning device.

Referring now to FIG. 3, FIG. 3 is a flowchart diagram showing an operational control method for the autonomous cleaning device. As shown in FIG. 3, the FIG. 300 illustrates a sensor-driven decision workflow controlling the cleaning operation of the solar panel autonomous robotic cleaning device. The workflow begins at step 302, where the autonomous robotic cleaning device enters a standby or system initialization state, during which the components of the autonomous robotic cleaning device, such as the control system 118A, the plurality of sensors, and the power supply system 106A, are initialized and verified for starting the process of the autonomous robotic cleaning device. The workflow then proceeds to step 304, in which the autonomous robotic cleaning device checks the operating mode to determine whether the autonomous cleaning operation is enabled. At step 305, the control system 118A evaluates whether the cleaning cycle is active; if the cleaning cycle is not active, the autonomous robotic cleaning device returns to the operating mode check, whereas an affirmative condition advances the process to the sensing process. In step 306, the autonomous robotic cleaning device processes inputs from the plurality of sensors to assess surface conditions as well as dust accumulation on the photovoltaic panel. Based on this processing, the microcontroller evaluates multiple conditional parameters, including limited performance at step 308, low light intensity at step 310, and dust detection at step 312, each representing indicators of panel soiling or efficiency degradation. If none of these conditions are met, the microcontroller bypasses cleaning and advances to step 316, where it transitions to the next photovoltaic panel for continued monitoring. Conversely, if one or more of the conditions indicate significant dust accumulation or reduced panel performance, the microcontroller proceeds to step 314, where the cleaning operation is initiated by activating the air-based cleaning assembly.

Figure 4:
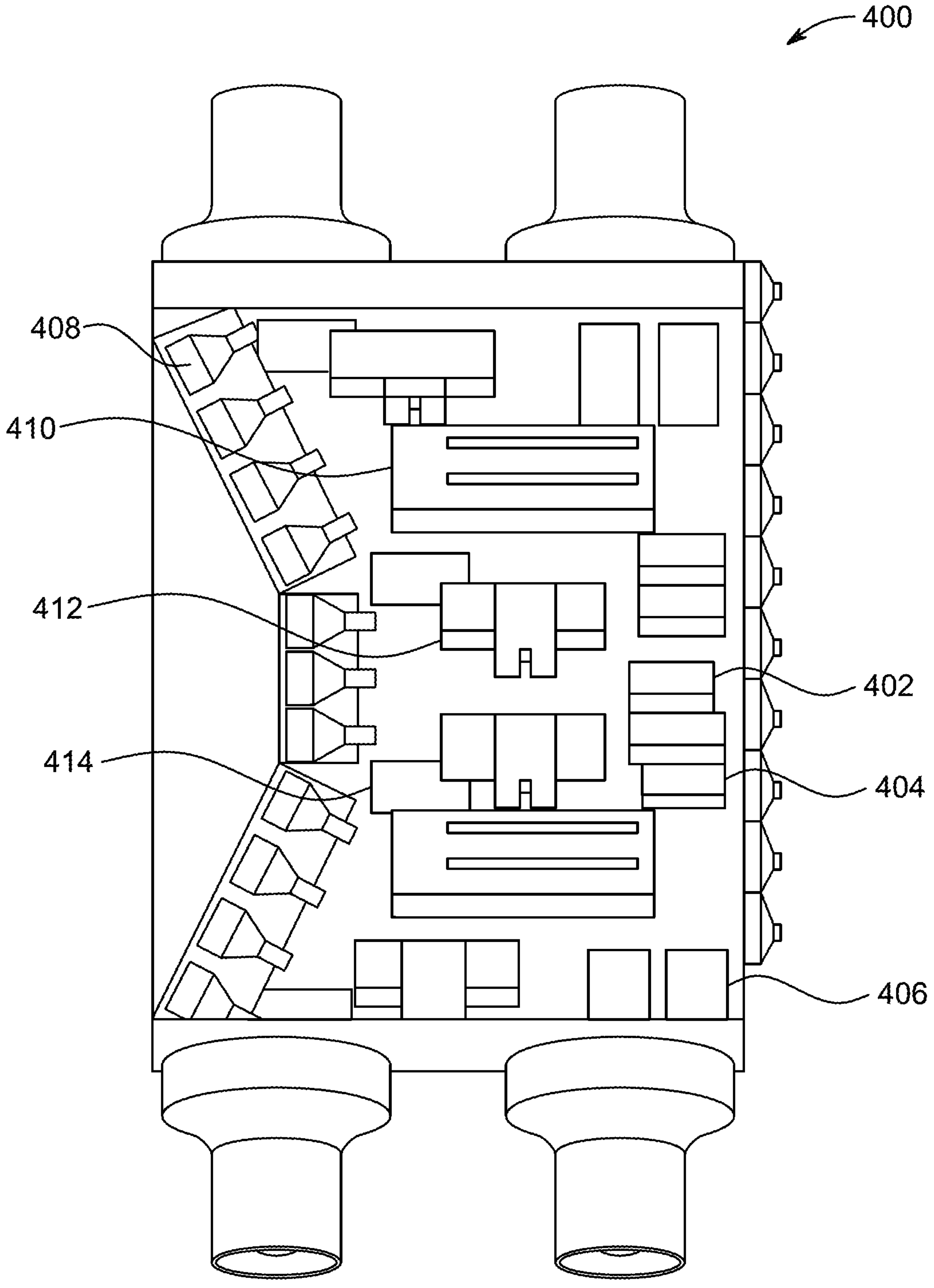
FIG. 4 is a schematic view of an integrated electronic and control assembly incorporating nozzles of the autonomous cleaning device.

Referring now to FIG. 4, is a schematic view of an integrated electronic and control assembly incorporating nozzles of the autonomous cleaning device.

As shown in FIG. 4, the FIG. 400 illustrates an internal layout of an air-based cleaning assembly and control system 118A integrated within the autonomous robotic cleaning device, showing the spatial arrangement and functional interconnection of key electronic, pneumatic, and control components. The autonomous robotic cleaning device includes the microcontroller 402, which serves as the central control unit, executing programmed control logic to coordinate autonomous cleaning operations, geared motor actuation, and control timing. A three-way solenoid valve 404 is electrically actuated by the microcontroller 402 to selectively route compressed air towards the multi-nozzle assembly 408, and enables controlled routing and termination of airflow during cleaning mode. The motor driver 406 is operatively coupled to the microcontroller 402 and is configured to regulate power delivery to the geared motors associated with the independently driven acrylic wheels 104A (as illustrated in FIG. 1A), allowing omnidirectional movement during cleaning. The multi-nozzle assembly 408 is arranged along the cleaning edge of the autonomous robotic cleaning device and is configured to discharge high-velocity air jets toward the photovoltaic surface for dust removal. The battery 410 provides electrical power to the microcontroller 402, compressor 412, three-way solenoid valve 404, and motor driver 406, supporting autonomous operation without external power input. The compressor 412 is configured to generate pressurized air required for the nozzle-based cleaning operation, while a dedicated compressor driver 414 controls the operational parameters of the compressor 412, such as activation timing and power modulation, under the control of the microcontroller.

Figure 5:
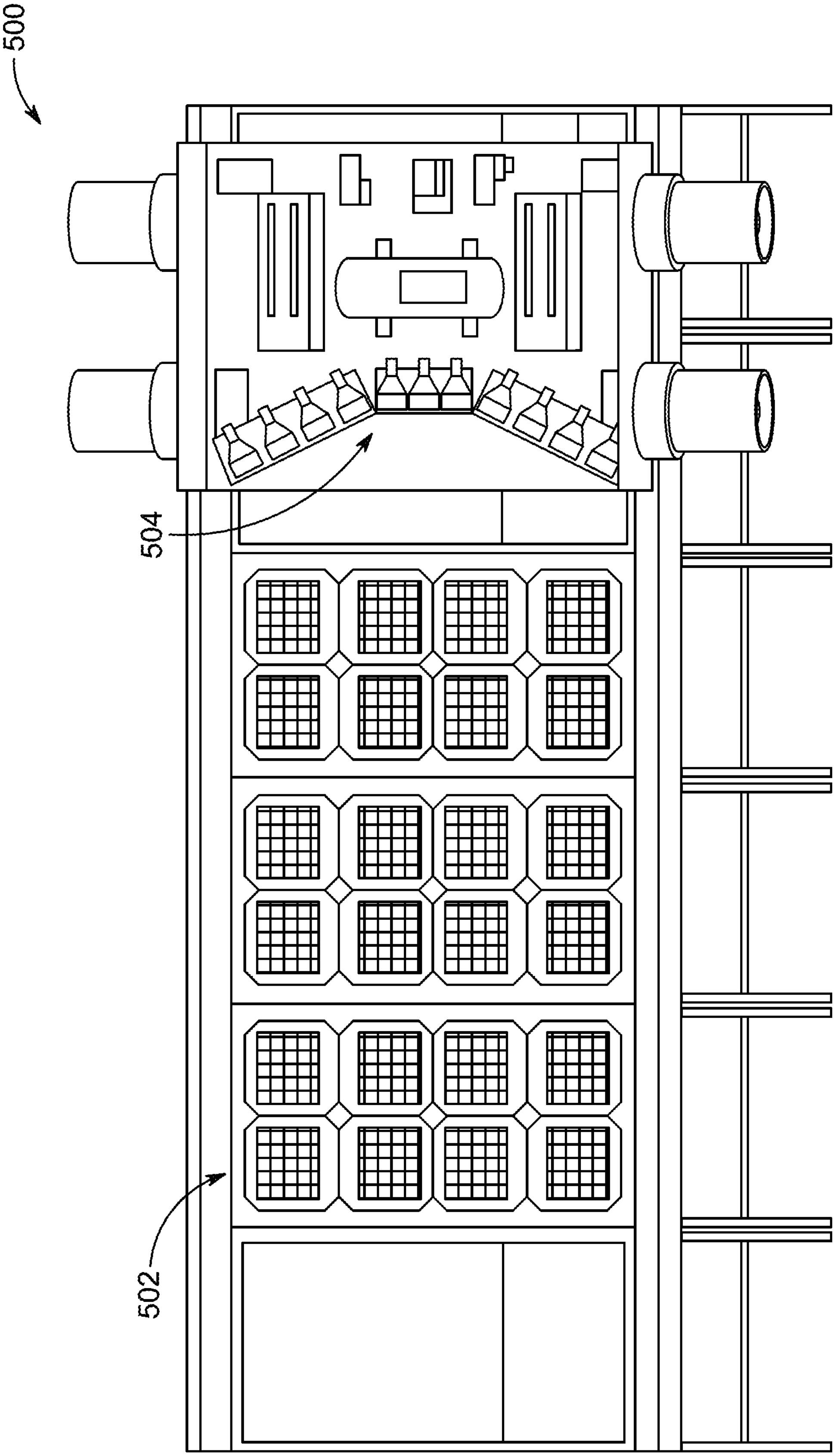
FIG. 5 is a top view of the autonomous cleaning device positioned adjacent to a solar panel with compressor connected to tank.

Referring now to FIG. 5 is a top view of the autonomous cleaning device positioned adjacent to a solar panel with a compressor connected to a tank.

As shown in FIG. 5, the FIG. 500 illustrates design of the autonomous robotic cleaning device, where the air-based cleaning assembly comprising the air compressor 504 connected to the air tank is integrated with the autonomous robotic cleaning device. The autonomous robotic cleaning device is positioned adjacent to the photovoltaic panel array 502 and is configured to traverse the panel surfaces in a rail-free manner. In this embodiment, the air compressor 504 is fluidly coupled to an intermediate air tank, which functions as a pressure reservoir to store compressed air before discharge. The stored compressed air is selectively released through the plurality of nozzles arranged along the cleaning edge of the autonomous robotic cleaning device, enabling the generation of multiple high-velocity air jets directed toward the surface of the photovoltaic panel array 502 for dust removal. The inclusion of the air tank helps stabilize pressure fluctuations and allows short bursts of high-pressure airflow during cleaning mode.

Figure 6:
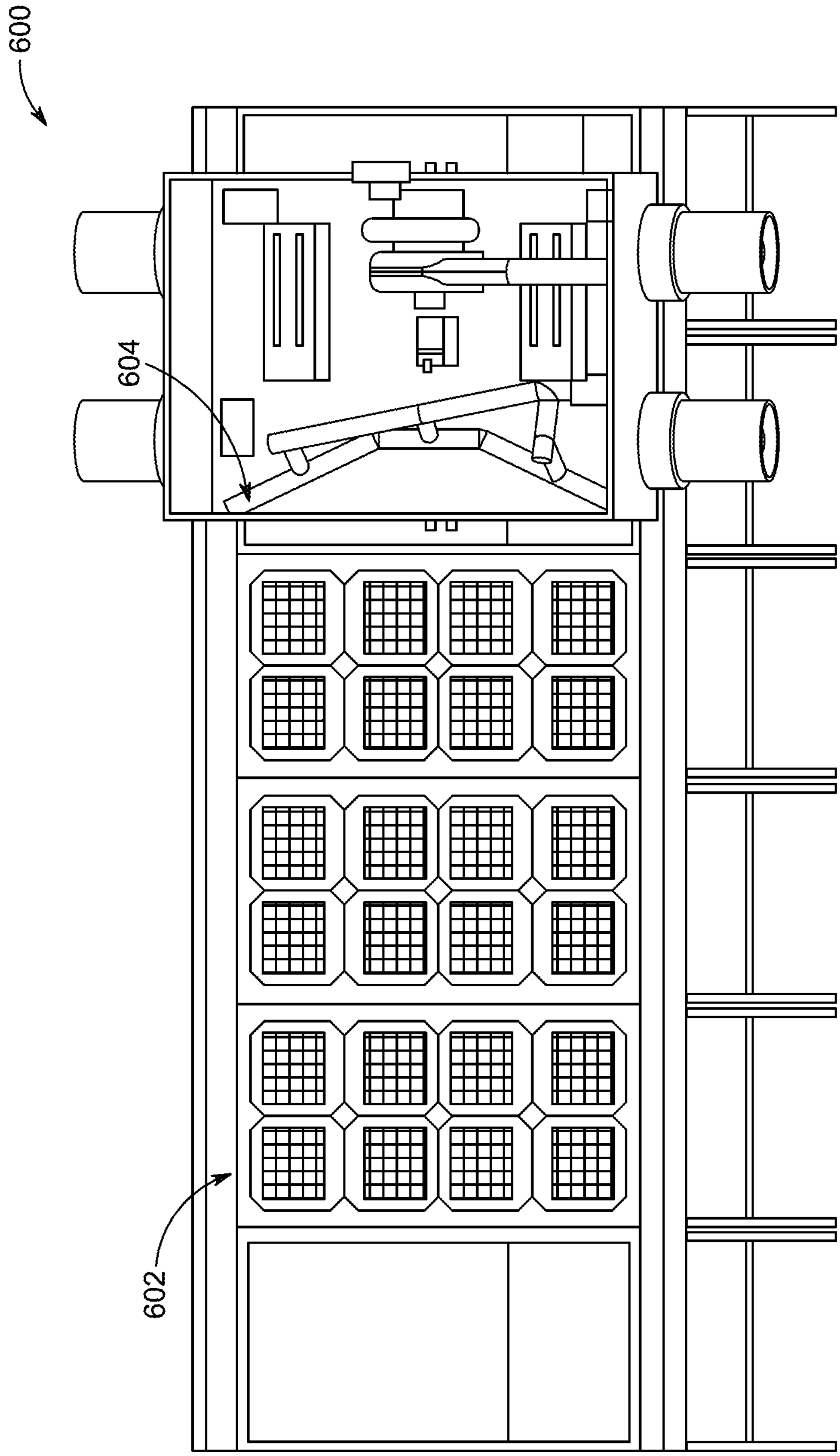
FIG. 6 is a top view of the autonomous robot cleaning device showing tubes instead of nozzles.

FIG. 6, is a top view of the autonomous robot cleaning device showing tubes instead of nozzles. As shown in FIG. 6, the FIG. 600 illustrates the design of the autonomous robot cleaning device, where the air-based cleaning mechanism is implemented using perforated tubes 604 instead of discrete nozzles, representing an optimized and simplified cleaning configuration. In FIG. 600, the autonomous robot cleaning device is positioned adjacent to the photovoltaic panel array 602 and is configured for rail-free traversal across the panel surfaces. In this embodiment, the air-based cleaning assembly comprises one or more elongated perforated tubes 604 mounted along the cleaning edge of the autonomous robot cleaning device, each perforated tube 604 having plurality of distributed perforations along the length. The perforated tubes 604 are fluidly coupled to the high-speed centrifugal blower, which supplies pressurized airflow into the interior of the perforated tubes 604. During operation, air is uniformly expelled through the perforations to form a continuous high-velocity air curtain extending across the width of the photovoltaic panel array 602, thereby dislodging and removing accumulated dust without physical contact or water usage.

Figure 7:
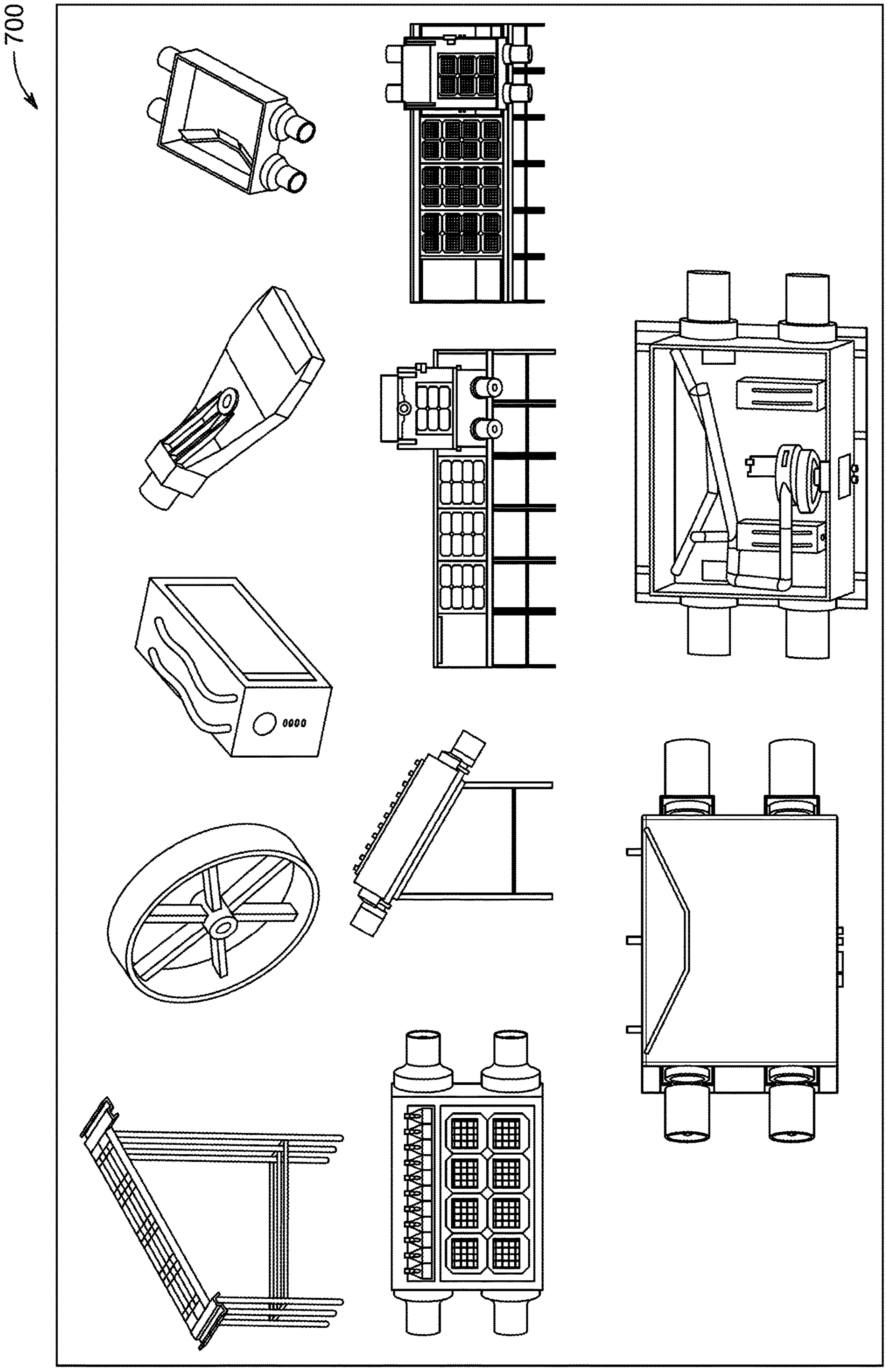
FIG. 7 is an illustration of the CAD modelling of the autonomous robot cleaning device and its components.

Referring now to FIG. 7, is an illustration of the CAD modelling of the autonomous robot cleaning device and its components.

As shown in FIG. 7, the FIG. 700 illustrates a computer-aided design (CAD) modelling of autonomous robot cleaning device, illustrating multiple perspective views to depict the structural, mechanical, and functional integration of the autonomous robot cleaning device components. The CAD modelling shows the lightweight modular aluminum chassis 102A (as illustrated in FIG. 1A) configured to traverse photovoltaic panels, with the plurality of independently driven acrylic wheel 104A (as illustrated in FIG. 1A) assemblies mounted along the lower portion of the modular aluminum chassis 102A (as illustrated in FIG. 1A) to enable stable, rail-free movement across panel surfaces. The upper region of the autonomous robot cleaning device depicts the onboard solar panel 108A (as illustrated in FIG. 1A), mounted on the top side of the modular aluminum chassis 102A (as illustrated in FIG. 1A), configured to harvest solar energy for intermittent self-charging of the rechargeable battery packs of the power supply system 106A (as illustrated in FIG. 1A). Further, the CAD views illustrate the arrangement of power supply components, control electronics, motor drivers, and pneumatic elements, including the air-based cleaning assembly. The cleaning mechanism is shown in alternative configurations, including the tube-based air curtain assembly extending across the cleaning edge, designed to uniformly release high-velocity airflow for non-contact dust removal. The CAD layouts further demonstrate the placement of the microcontroller, rechargeable battery packs, compressor or centrifugal blower, and airflow routing channels, highlighting a compact and balanced mass distribution.

Figure 8:
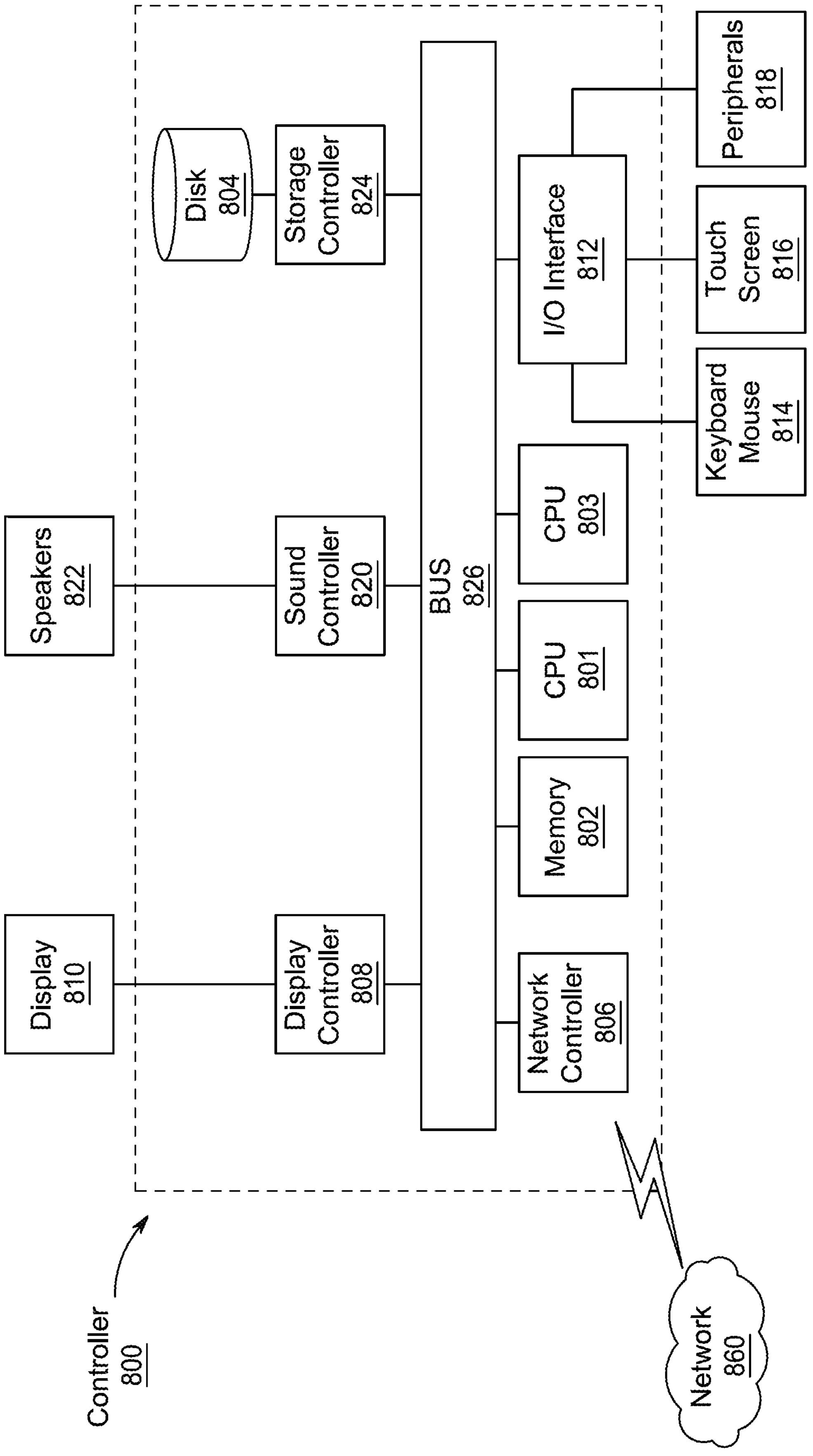
FIG. 8 is an illustration of a non-limiting example of details of computing hardware used in the computing system, according to certain embodiments.

Next, further details of the hardware description of the computing environment according to exemplary embodiments is described with reference to FIG. 8. In FIG. 8, a controller 800 is described is representative of the system 100 of FIG. 1 in which the controller is a computing device which includes a CPU 801 which performs the processes described above/below. The process data and instructions may be stored in memory 802. These processes and instructions may also be stored on a storage medium disk 804 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 801, 803 and an operating system such as Microsoft Windows 7, Microsoft Windows 10, Microsoft Windows 11, UNIX, Solaris, LINUX, Apple MAC-OS and other systems known to those skilled in the art.

The hardware elements in order to achieve the computing device may be realized by various circuitry elements, known to those skilled in the art. For example, CPU 801 or CPU 803 may be a Xenon or Core processor from Intel of America or an Opteron processor from AMD of America, or may be other processor types that would be recognized by one of ordinary skill in the art. Alternatively, the CPU 801, 803 may be implemented on an FPGA, ASIC, PLD or using discrete logic circuits, as one of ordinary skill in the art would recognize. Further, CPU 801, 803 may be implemented as multiple processors cooperatively working in parallel to perform the instructions of the inventive processes described above.

The computing device in FIG. 8 also includes a network controller 806, such as an Intel Ethernet PRO network interface card from Intel Corporation of America, for interfacing with network 860. As can be appreciated, the network 860 can be a public network, such as the Internet, or a private network such as an LAN or WAN network, or any combination thereof and can also include PSTN or ISDN subnetworks. The network 860 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The computing device further includes a display controller 808, such as a NVIDIA Geforce GTX or Quadro graphics adaptor from NVIDIA Corporation of America for interfacing with display 810, such as a Hewlett Packard HPL2445w LCD monitor. A general purpose I/O interface 812 interfaces with a keyboard and/or mouse 814 as well as a touch screen panel 811 on or separate from display 810. General purpose I/O interface also connects to a variety of peripherals 818 including printers and scanners, such as an OfficeJet or DeskJet from Hewlett Packard.

A sound controller 820 is also provided in the computing device such as Sound Blaster X-Fi Titanium from Creative, to interface with speakers/microphone 822 thereby providing sounds and/or music.

The general purpose storage controller 824 connects the storage medium disk 804 with communication bus 826, which may be an ISA, EISA, VESA, PCI, or similar, for interconnecting all of the components of the computing device. A description of the general features and functionality of the display 810, keyboard and/or mouse 814, as well as the display controller 808, storage controller 824, network controller 806, sound controller 820, and general purpose I/O interface 812 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 9.

Figure 9:
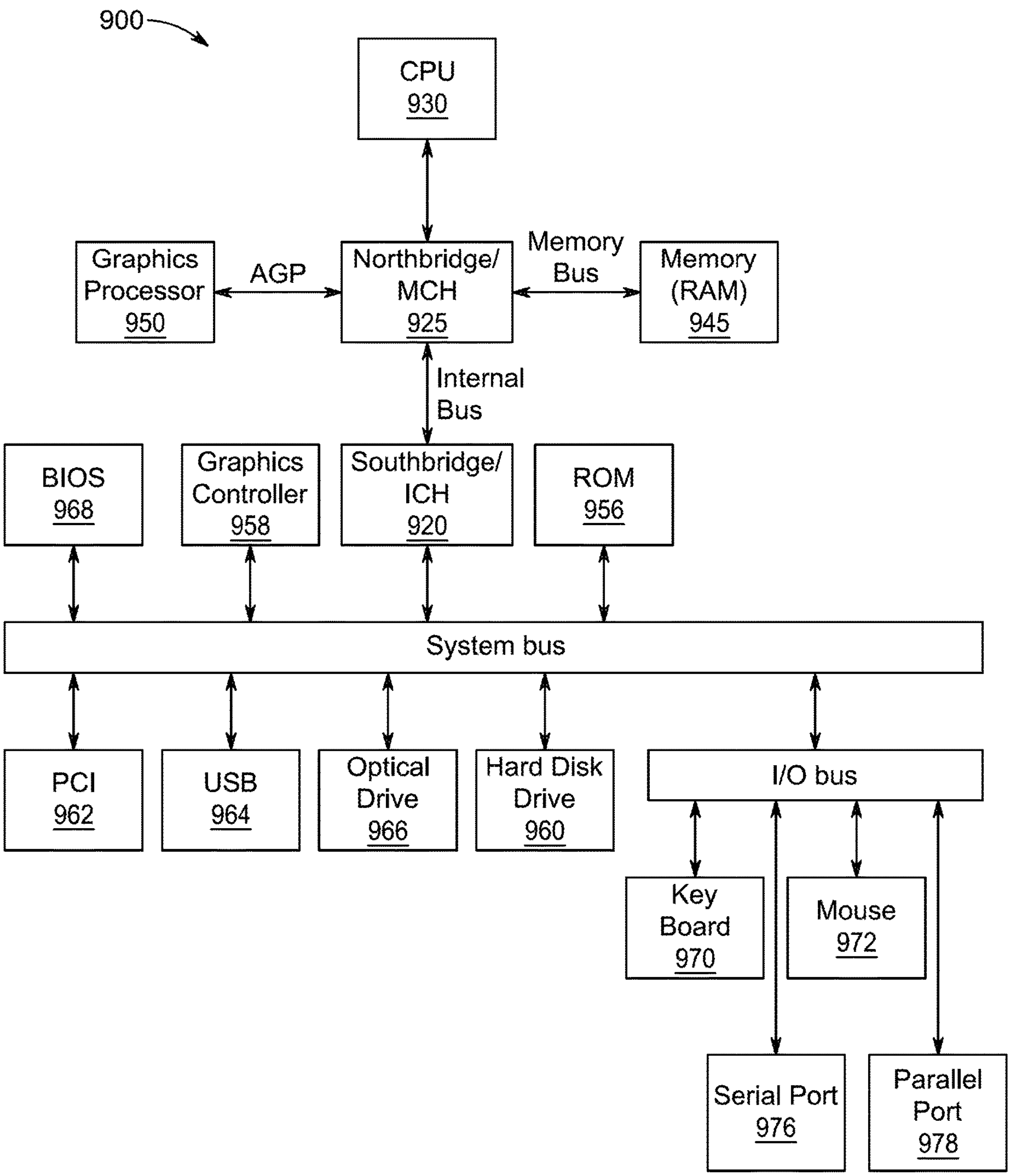
FIG. 9 is an exemplary schematic diagram of a data processing system used within the computing system, according to certain embodiments.

FIG. 9 shows a schematic diagram of a data processing system, according to certain embodiments, for performing the functions of the exemplary embodiments. The data processing system is an example of a computer in which code or instructions implementing the processes of the illustrative embodiments may be located.

In FIG. 9, data processing system 900 employs a hub architecture including a north bridge and memory controller hub (NB/MCH) 925 and a south bridge and input/output (I/O) controller hub (SB/ICH) 920. The central processing unit (CPU) 930 is connected to NB/MCH 925. The NB/MCH 925 also connects to the memory 945 via a memory bus and connects to the graphics processor 950 via an accelerated graphics port (AGP). The NB/MCH 925 also connects to the SB/ICH 920 via an internal bus (e.g., a unified media interface or a direct media interface). The CPU Processing unit 930 may contain one or more processors and even may be implemented using one or more heterogeneous processor systems.

Figure 10:
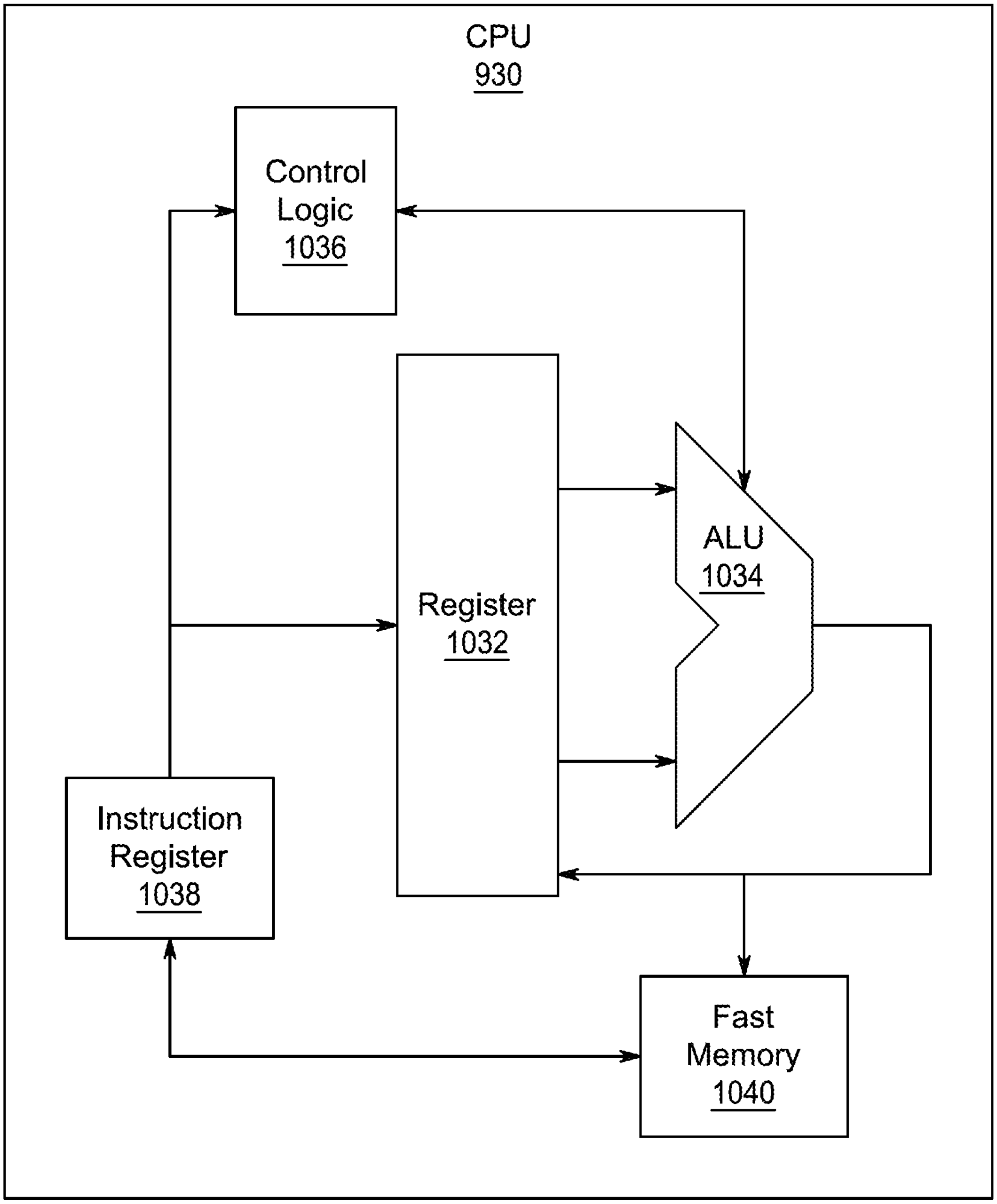
FIG. 10 is an exemplary schematic diagram of a processor used with the computing system, according to certain embodiments.

For example, FIG. 10 shows one implementation of CPU 930. In one implementation, the instruction register 1038 retrieves instructions from the fast memory 1040. At least part of these instructions are fetched from the instruction register 1038 by the control logic 1036 and interpreted according to the instruction set architecture of the CPU 930. Part of the instructions can also be directed to the register 1032. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 1034 that loads values from the register 1032 and performs logical and mathematical operations on the loaded values according to the instructions. The results from these operations can be fed back into the register and/or stored in the fast memory 1040.

According to certain implementations, the instruction set architecture of the CPU 930 can use a reduced instruction set architecture, a complex instruction set architecture, a vector processor architecture, and a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM, a SPARC architecture processor by Sun Microsystems or by Oracle or other known CPU architecture.

Referring again to FIG. 9, the data processing system 900 can include that the SB/ICH 920 is coupled through a system bus to an I/O Bus, a read only memory (ROM) 956, universal serial bus (USB) port 964, a flash binary input/output system (BIOS) 968, and a graphics controller 958. PCI/PCIe devices can also be coupled to SB/ICH 920 through a PCI bus 962.

The PCI devices may include, for example, Ethernet adapters, add-in cards, and PC cards for notebook computers. The Hard disk drive 960 and CD-ROM 966 can use, for example, an integrated drive electronics (IDE) or serial advanced technology attachment (SATA) interface. In one implementation the I/O bus can include a super I/O (SIO) device.

Further, the hard disk drive (HDD) 960 and optical drive 966 can also be coupled to the SB/ICH 920 through a system bus. In one implementation, a keyboard 970, a mouse 972, a parallel port 978, and a serial port 976 can be connected to the system bus through the I/O bus. Other peripherals and devices that can be connected to the SB/ICH 920 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes in battery sizing and chemistry or based on the requirements of the intended back-up load to be powered.

Figure 11:
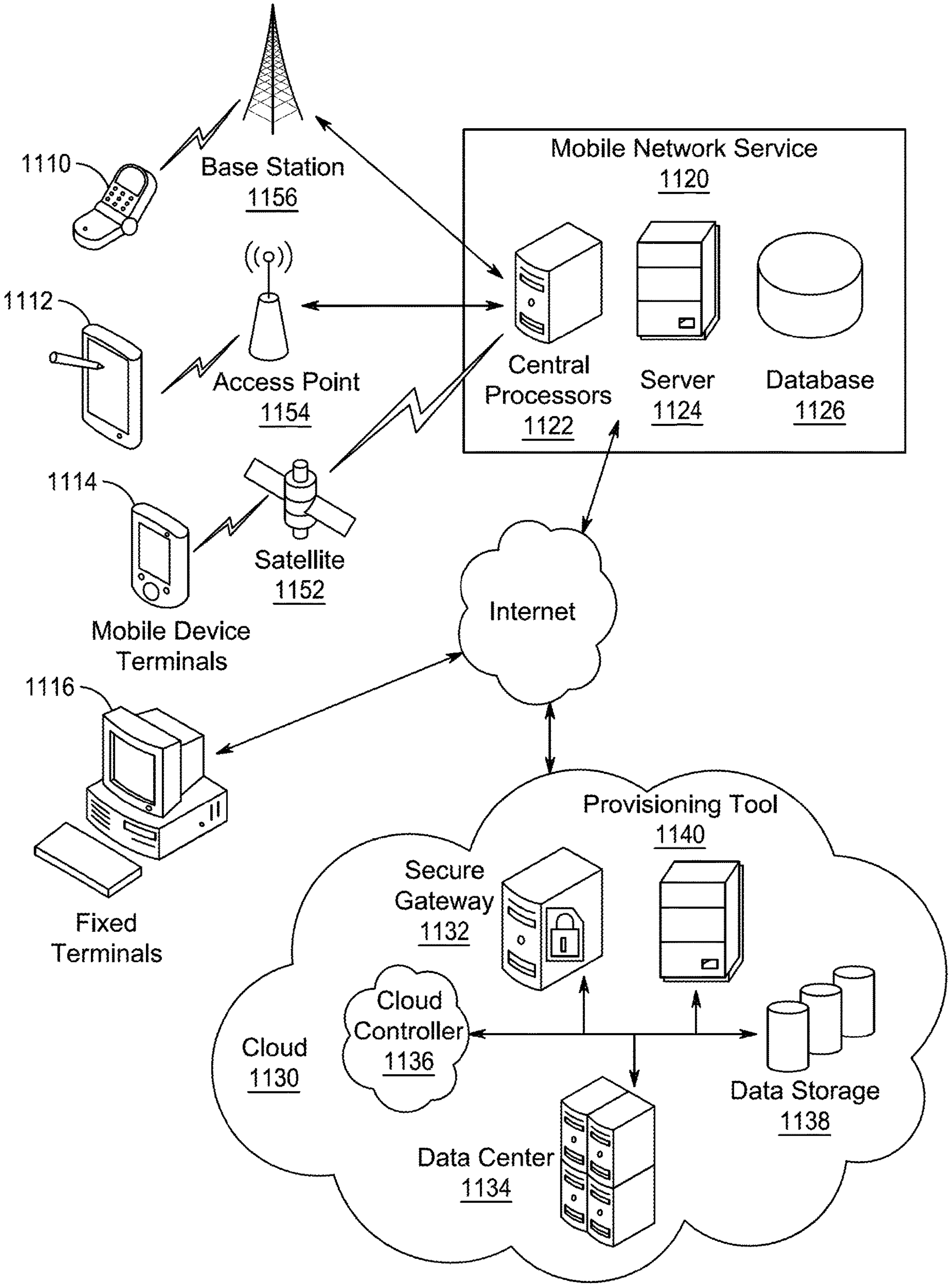
FIG. 11 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 1130 including a cloud controller 1136, a secure gateway 1132, a data center 1134, data storage 1138 and a provisioning tool 1140, and mobile network services 1120 including central processors 1122, a server 1124 and a database 1126, which may share processing, as shown by FIG. 11, in addition to various human interface and communication devices (e.g., display monitors 1116, smart phones 1110, tablets 1112, personal digital assistants (PDAs) 1114). The network may be a private network, such as a LAN, satellite 1152 or WAN 1154, or or may be a public network, such as the Internet. Input to the system may be received via direct user input and received remotely, either in real-time or as a batch process. Additionally, some implementations may be performed on modules or hardware not identical to those described. Accordingly, other implementations are within the scope that may be claimed.

Although techniques using, and apparatuses including Autonomous Robotic Cleaning Devices have been described in language specific to features and/or methods, it is to be understood that the subject of the appended claims is not necessarily limited to the specific features or methods described. Rather, the specific features and methods are example implementations of Autonomous Robotic Cleaning Devices.

Some Examples are described below:

Example 1. A system for monitoring and managing cleaning operations and cooling of solar panels, comprising: a wireless sensor network comprising: a plurality of environmental sensor nodes configured to measure and transmit environmental data including dust levels, solar irradiance, temperature, humidity, and wind, wherein the plurality of environmental sensor nodes are arranged in a configurable spatial arrangement; a plurality of electrical sensor nodes configured to monitor and transmit electrical performance data including current, voltage, and power from solar panels, inverters, and battery banks; and a master coordinator node in wireless communication with the plurality of environmental sensor nodes and the plurality of electrical sensor nodes; a central processing unit operatively coupled to the master coordinator node and configured to receive the environmental data and the electrical performance data; at least one camera selected from an RGB camera and a thermal camera, the at least one camera operatively coupled to the central processing unit and configured to capture visual data of the solar panels; a decision engine operatively coupled to the central processing unit and configured to determine cleaning schedules based on the environmental data, the electrical performance data, and the visual data; and a cleaning mechanism operatively coupled to the decision engine, wherein the cleaning mechanism is configured to clean the solar panels in accordance with the determined cleaning schedules.

Example 2. The system of example 1, wherein the cleaning mechanism comprises: a dual parallel track system; two sheaves mounted on the dual parallel track system, each sheave comprising a stepper motor, wherein a first sheave comprises a fisheye radial spherical joint bearing and a rod, and a second sheave is configured to feed water or air; a cleaning shaft extending between the two sheaves, the cleaning shaft comprising: two pipes with parallel lines of nozzles configured to spray water; a line with uniformly distributed holes configured to compress and suction air; and two parallel wipers movable vertically along the cleaning shaft; and a wireless command receiver unit operatively coupled to the decision engine and configured to control movement of the cleaning mechanism along the dual parallel track system.

Example 3. The system of example 1, wherein the decision engine adapts a cleaning strategy dynamically, and the cleaning strategy is based at least in part on a type and speed of the cleaning, electrical parameters, environmental data patterns, RGB or thermal images, and videos.

Example 4. The system of example 1, wherein the cleaning mechanism includes an autonomous cleaning arm that operates wirelessly upon receiving commands from the decision engine.

Example 5. The system of example 1, wherein the system incorporates a hybrid AI model featuring: artificial intelligence algorithms for data compression to handle large-scale data, an image and video processing module, and a supervised learning model; and wherein the supervised learning model is trained on stored datasets containing electrical parameters of solar station components, performance metrics, and corresponding environmental conditions to predict cleaning thresholds and maintenance requirements.

Example 6. The system of example 1, wherein the wireless sensor network uses ZigBee technology for wireless digital transmission.

Example 7. The system of example 1, further comprising a water recycling unit configured to purify wastewater for reuse in cleaning and cooling operations.

Example 8. The system of example 1, wherein the decision engine is configured to differentiate between performance losses caused by panel soiling and performance losses caused by electrical or physical faults.

Example 9. The system of example 1, further comprising a drone configured to carry the at least one camera for aerial visual and thermal inspection of the solar panels.

Example 10. The system of example 9, further comprising a flight path optimizer configured to calculate inspection routes based on solar panel arrangement, past dirt accumulation patterns, site topography, and areas prone to electrical failures.

Example 11. The system of example 1, further comprising a user interface dashboard configured to: display real-time system measurements, dirt levels, performance degradation, thermal anomalies, and electrical and physical failures; and provide cleaning, cooling, protection, and maintenance recommendations.

Example 12. A method for monitoring and managing cleaning operations and cooling of solar panels, comprising: measuring and transmitting, by a plurality of environmental sensor nodes arranged in a configurable spatial arrangement, environmental data including dust levels, solar irradiance, temperature, humidity, and wind; monitoring and transmitting, by a plurality of electrical sensor nodes, electrical performance data including current, voltage, and power from solar panels, inverters, and battery banks; receiving, by a master coordinator node, the environmental data and the electrical performance data from the plurality of environmental sensor nodes and the plurality of electrical sensor nodes; capturing, by at least one camera selected from an RGB camera and a thermal camera, visual data of the solar panels; determining, by a decision engine, cleaning schedules based on the environmental data, the electrical performance data, and the visual data; and cleaning, by a cleaning mechanism, the solar panels in accordance with the determined cleaning schedules.

Example 13. The method of example 12, wherein cleaning the solar panels comprises: moving the cleaning mechanism along a dual parallel track system; selectively operating one or more of: compressing or suctioning air through a line with uniformly distributed holes; and moving two parallel wipers vertically along a cleaning shaft.

Example 14. The method of example 12, further comprising: analyzing the environmental data, the electrical performance data, and the visual data using a hybrid AI model comprising artificial intelligence algorithms for data compression, an image and video processing module, and a supervised learning model; and predicting cleaning thresholds sand maintenance requirements based on the analysis.

Example 15. The method of example 12, further comprising dynamically adapting a cleaning strategy based at least in part on a type and speed of the cleaning, electrical parameters, environmental data patterns, RGB or thermal images, and videos.

Example 16. The method of example 12, further comprising: differentiating between performance losses caused by panel soiling and performance losses caused by electrical or physical faults; and generating diagnostic outputs and triggering alerts based on the differentiation.

Example 17. The method of example 12, further comprising: recycling wastewater from cleaning operations; and reusing the recycled wastewater in subsequent cleaning and cooling operations.

Example 18. A non-transitory computer-readable medium storing instructions that, when executed by a processor, cause the processor to: receive environmental data including dust levels, solar irradiance, temperature, humidity, and wind from a plurality of environmental sensor nodes arranged in a configurable spatial arrangement; receive electrical performance data including current, voltage, and power from a plurality of electrical sensor nodes monitoring solar panels, inverters, and battery banks; receive visual data of the solar panels from at least one camera selected from an RGB camera and a thermal camera; determine cleaning schedules based on the environmental data, the electrical performance data, and the visual data; and transmit commands to a cleaning mechanism to clean the solar panels in accordance with the determined cleaning schedules.

Example 19. The non-transitory computer-readable medium of example 18, wherein the instructions further cause the processor to: analyze the environmental data, the electrical performance data, and the visual data using a hybrid AI model comprising artificial intelligence algorithms for data compression, an image and video processing module, and a supervised learning model trained on stored datasets containing electrical parameters of solar station components, performance metrics, and corresponding environmental conditions; and predict cleaning thresholds and maintenance requirements based on the analysis.

Example 20. The non-transitory computer-readable medium of example 18, wherein the instructions further cause the processor to: differentiate between performance losses caused by panel soiling and performance losses caused by electrical or physical faults; generate diagnostic outputs based on the differentiation; and trigger alerts for operators based on the diagnostic outputs.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A system for monitoring and managing cleaning operations and cooling of solar panels, comprising:
- a wireless sensor network comprising:
- a plurality of environmental sensor nodes configured to measure and transmit environmental data including dust levels, solar irradiance, temperature, humidity, and wind, wherein the plurality of environmental sensor nodes are arranged in a configurable spatial arrangement;
- a plurality of electrical sensor nodes configured to monitor and transmit electrical performance data including current, voltage, and power from solar panels, inverters, and battery banks; and
- a master coordinator node in wireless communication with the plurality of environmental sensor nodes and the plurality of electrical sensor nodes;
- a central processing unit operatively coupled to the master coordinator node and configured to receive the environmental data and the electrical performance data;
- at least one camera selected from an RGB camera and a thermal camera, the at least one camera operatively coupled to the central processing unit and configured to capture visual data of the solar panels;
- a decision engine operatively coupled to the central processing unit and configured to determine cleaning schedules based on the environmental data, the electrical performance data, and the visual data; and
- a cleaning mechanism operatively coupled to the decision engine, wherein the cleaning mechanism is configured to clean the solar panels in accordance with the determined cleaning schedules.

2. The system of claim 1, wherein the cleaning mechanism comprises:
- a dual parallel track system;
- two sheaves mounted on the dual parallel track system, each sheave comprising a stepper motor, wherein a first sheave comprises a fisheye radial spherical joint bearing and a rod, and a second sheave is configured to feed water or air;
- a cleaning shaft extending between the two sheaves, the cleaning shaft comprising:
- two pipes with parallel lines of nozzles configured to spray water;
- a line with uniformly distributed holes configured to compress and suction air; and
- two parallel wipers movable vertically along the cleaning shaft; and
- a wireless command receiver unit operatively coupled to the decision engine and configured to control movement of the cleaning mechanism along the dual parallel track system.

3. The system of claim 1, wherein the cleaning mechanism includes an autonomous cleaning arm that operates wirelessly upon receiving commands from the decision engine.

4. The system of claim 1, wherein the system incorporates a hybrid AI model featuring:
- artificial intelligence algorithms for data compression to handle large-scale data,
- an image and video processing module, and
- a supervised learning model; and
- wherein the supervised learning model is trained on stored datasets containing electrical parameters of solar station components, performance metrics, and corresponding environmental conditions to predict cleaning thresholds and maintenance requirements.

5. The system of claim 1, wherein the wireless sensor network uses ZigBee technology for wireless digital transmission.

6. The system of claim 1, further comprising a water recycling unit configured to purify wastewater for reuse in cleaning and cooling operations.

7. The system of claim 1, wherein the decision engine is configured to differentiate between performance losses caused by panel soiling and performance losses caused by electrical or physical faults.

8. The system of claim 1, further comprising a drone configured to carry the at least one camera for aerial visual and thermal inspection of the solar panels.

9. The system of claim 8, further comprising a flight path optimizer configured to calculate inspection routes based on solar panel arrangement, past dirt accumulation patterns, site topography, and areas prone to electrical failures.

10. The system of claim 1, further comprising a user interface dashboard configured to:

display real-time system measurements, dirt levels, performance degradation, thermal anomalies, and electrical and physical failures; and provide cleaning, cooling, protection, and maintenance recommendations.

11. A method for monitoring and managing cleaning operations and cooling of solar panels, comprising:

measuring and transmitting, by a plurality of environmental sensor nodes arranged in a configurable spatial arrangement, environmental data including dust levels, solar irradiance, temperature, humidity, and wind;

monitoring and transmitting, by a plurality of electrical sensor nodes, electrical performance data including current, voltage, and power from solar panels, inverters, and battery banks;

receiving, by a master coordinator node, the environmental data and the electrical performance data from the plurality of environmental sensor nodes and the plurality of electrical sensor nodes;

capturing, by at least one camera selected from an RGB camera and a thermal camera, visual data of the solar panels;

determining, by a decision engine, cleaning schedules based on the environmental data, the electrical performance data, and the visual data; and cleaning, by a cleaning mechanism, the solar panels in accordance with the determined cleaning schedules.

12. The method of claim 11, wherein cleaning the solar panels comprises:

moving the cleaning mechanism along a dual parallel track system;

selectively operating one or more of:

compressing or suctioning air through a line with uniformly distributed holes; and moving two parallel wipers vertically along a cleaning shaft.

13. The method of claim 11, further comprising:

analyzing the environmental data, the electrical performance data, and the visual data using a hybrid AI model comprising artificial intelligence algorithms for data compression, an image and video processing module, and a supervised learning model; and predicting cleaning thresholds and maintenance requirements based on the analysis.

14. The method of claim 11, further comprising:

differentiating between performance losses caused by panel soiling and performance losses caused by electrical or physical faults; and generating diagnostic outputs and triggering alerts based on the differentiation.

15. The method of claim 11, further comprising:

recycling wastewater from cleaning operations to obtain recycled waste water; and reusing the recycled wastewater in subsequent cleaning and cooling operations.

16. A non-transitory computer-readable medium storing instructions that, when executed by a processor, cause the processor to:

receive environmental data including dust levels, solar irradiance, temperature, humidity, and wind from a plurality of environmental sensor nodes arranged in a configurable spatial arrangement;

receive electrical performance data including current, voltage, and power from a plurality of electrical sensor nodes monitoring solar panels, inverters, and battery banks;

receive visual data of the solar panels from at least one camera selected from an RGB camera and a thermal camera;

determine cleaning schedules based on the environmental data, the electrical performance data, and the visual data; and transmit commands to a cleaning mechanism to clean the solar panels in accordance with the determined cleaning schedules.

17. The non-transitory computer-readable medium of claim 16, wherein the instructions further cause the processor to:

analyze the environmental data, the electrical performance data, and the visual data using a hybrid AI model comprising artificial intelligence algorithms for data compression, an image and video processing module, and a supervised learning model trained on stored datasets containing electrical parameters of solar station components, performance metrics, and corresponding environmental conditions; and predict cleaning thresholds and maintenance requirements based on the analysis.

18. The non-transitory computer-readable medium of claim 16, wherein the instructions further cause the processor to:

differentiate between performance losses caused by panel soiling and performance losses caused by electrical or physical faults;

generate diagnostic outputs based on the differentiation; and trigger alerts for operators based on the diagnostic outputs.

* * * * *